United States Patent
Cook et al.

[19]

[11] Patent Number: 5,950,603
[45] Date of Patent: Sep. 14, 1999

[54] VAPOR RECOVERY CONTROL SYSTEM FOR DIRECT INJECTION SPARK IGNITION ENGINES

[75] Inventors: Jeffrey Arthur Cook, Dearborn; Narayanan Sivashankar, Canton; Jing Sun, Novi, all of Mich.

[73] Assignee: Ford Global Technologies, Inc., Dearborn, Mich.

[21] Appl. No.: 09/074,749

[22] Filed: May 8, 1998

[51] Int. Cl.⁶ .................................................. F02M 37/04
[52] U.S. Cl. ........................................... 123/520; 123/436
[58] Field of Search ................................. 123/520, 521, 123/518, 519, 516, 436, 419, 295, 305

[56] References Cited

U.S. PATENT DOCUMENTS

| | | |
|---|---|---|
| 5,054,454 | 10/1991 | Hamburg . |
| 5,090,388 | 2/1992 | Hamburg et al. . |
| 5,245,975 | 9/1993 | Ito . |
| 5,331,933 | 7/1994 | Matsushita ............................. 123/295 |
| 5,438,967 | 8/1995 | Ito . |
| 5,469,832 | 11/1995 | Nemoto .................................. 123/519 |
| 5,694,904 | 12/1997 | Osanai .................................... 123/436 |
| 5,755,198 | 5/1998 | Grob ....................................... 123/295 |
| 5,826,565 | 10/1998 | Mueller .................................. 123/520 |
| 5,881,693 | 3/1999 | Mizuno .................................. 123/436 |

*Primary Examiner*—Carl S. Miller
*Attorney, Agent, or Firm*—Allan J. Lippa

[57] ABSTRACT

A vapor recovery control system for a direct injection spark ignition engine is used to purge vapors in both a homogeneous air/fuel and stratified air/fuel mode. When purging vapors in a stratified mode, a portion of the cylinders receive purge vapors and operate in a homogeneous mode while the rest of the cylinders continue to operate in a stratified mode.

19 Claims, 3 Drawing Sheets

VAPOR RECOVERY CONTROL SYSTEM FOR DIRECT INJECTION SPARK IGNITION ENGINES

BACKGROUND OF THE INVENTION

The field of the invention relates to control of direct injection engines. In particular, the field relates to vapor recovery control for direct injection spark ignition engines.

In direct injection engines, the engine control system operates the engine in both a stratified mode and a homogeneous mode. In the stratified mode, the combustion chambers contain stratified layers of different air/fuel mixtures. The strata closest to the spark plug contains a stoichiometric mixture or a mixture slightly rich of stoichiometry, and subsequent strata contain progressively leaner mixtures. In the homogenous mode, a mixture with relatively constant air/fuel properties is present throughout the cylinder volume.

Fuel vapor recovery systems are employed on motor vehicles and need to be combined with direct injection engines to reduce atmospheric emissions of hydrocarbons by storing the hydrocarbons in a canister. The canister, which is coupled to the fuel tank, uses activated charcoal for absorbing the hydrocarbons. The canister is periodically purged by passing ambient air, which desorbs the hydrocarbons, through the charcoal. The resulting air and hydrocarbon mixture subsidizes the normal mixture of air, from the intake system, and fuel, from the fuel delivery system, inducted into the engine via the engine port. The canister is then able to again store hydrocarbons allowing the process to repeat. The conventional fuel vapor recovery process must also be executed at regular intervals to assure that the canister does not become saturated.

To force ambient air through the canister, manifold vacuum is commonly used. However, manifold vacuum is a function of engine operating conditions. At certain conditions, especially when operating in the stratified mode, the manifold vacuum may not be enough to force air through the canister. Thus, many vapor recovery systems utilize a pump, or compressor, in the system to allow purging of the canister at all manifold vacuum levels. Such a system is disclosed in U.S. Pat. No. 5,054,454.

Also, conventional port injected purging systems can only form a homogeneous mixture because, when the engine inducts a mixture of air and fuel from the vapor recovery system, there is no way to form a stratified mixture. In other words, the stratified mixture depends on having an isolated region of a desired air/fuel ratio with the rest of the region progressively becoming leaner. Thus, purging is restricted to when the engine is operating in a homogeneous mode. One such system is disclosed in U.S. Pat. No. 5,245,975.

The inventors herein have recognized numerous disadvantages when applying known vapor recovery systems with direct injection engines. For example, when vapor recovery systems are utilized with direct injection engines, the requirement for purging at regular intervals is not fulfilled by simply using a pump, or compressor. Thus, operation in a stratified mode, which is advantageous to fuel economy, is limited by the necessity to purge the canister, resulting in less than optimal fuel economy. Another problem is if fuel vapors are purged during stratified operation, there will be unburned hydrocarbons in the exhaust.

SUMMARY OF THE INVENTION

An object of the invention herein is to control the vapor recovery of direct injection spark ignition internal combustion engines.

The above object is achieved, problems of prior approaches overcome, and the inherent advantages obtained, by providing a vapor recovery control method for a vapor recovery system coupled to a spark ignited engine having an air intake with a throttle positioned therein and having a homogeneous mode of operation with a homogeneous mixture of air and fuel within a plurality of combustion chambers and a stratified mode of operation with a stratified mixture of air and fuel within the plurality of combustion chambers. The engine also has a first set of cylinders and a second set of cylinders. The method comprises directing purge vapors into said first set of cylinders, operating said first set of cylinders in the homogeneous mode, and operating said second set of cylinders in the stratified mode.

By operating some of the cylinders in the stratified mode and some in the homogeneous mode, it is possible to utilize the purge vapors in the homogenous cylinders while still operating the rest of the cylinders in the stratified mode.

An advantage of the above aspect of the invention is that hydrocarbon emissions are controlled regardless of whether a direct injection spark ignition engine is operating in a homogeneous mode or a stratified mode.

Another advantage of the above aspect of the invention is that fuel economy enhancement is possible by operating some cylinders in the stratified mode while purging fuel vapors.

DESCRIPTION OF THE DRAWINGS

The object and advantages of the invention claimed herein will be more readily understood by reading an example of an embodiment in which the invention is used to advantage with reference to the following drawings wherein:

DESCRIPTION OF AN EXAMPLE OF OPERATION

Figure 1:
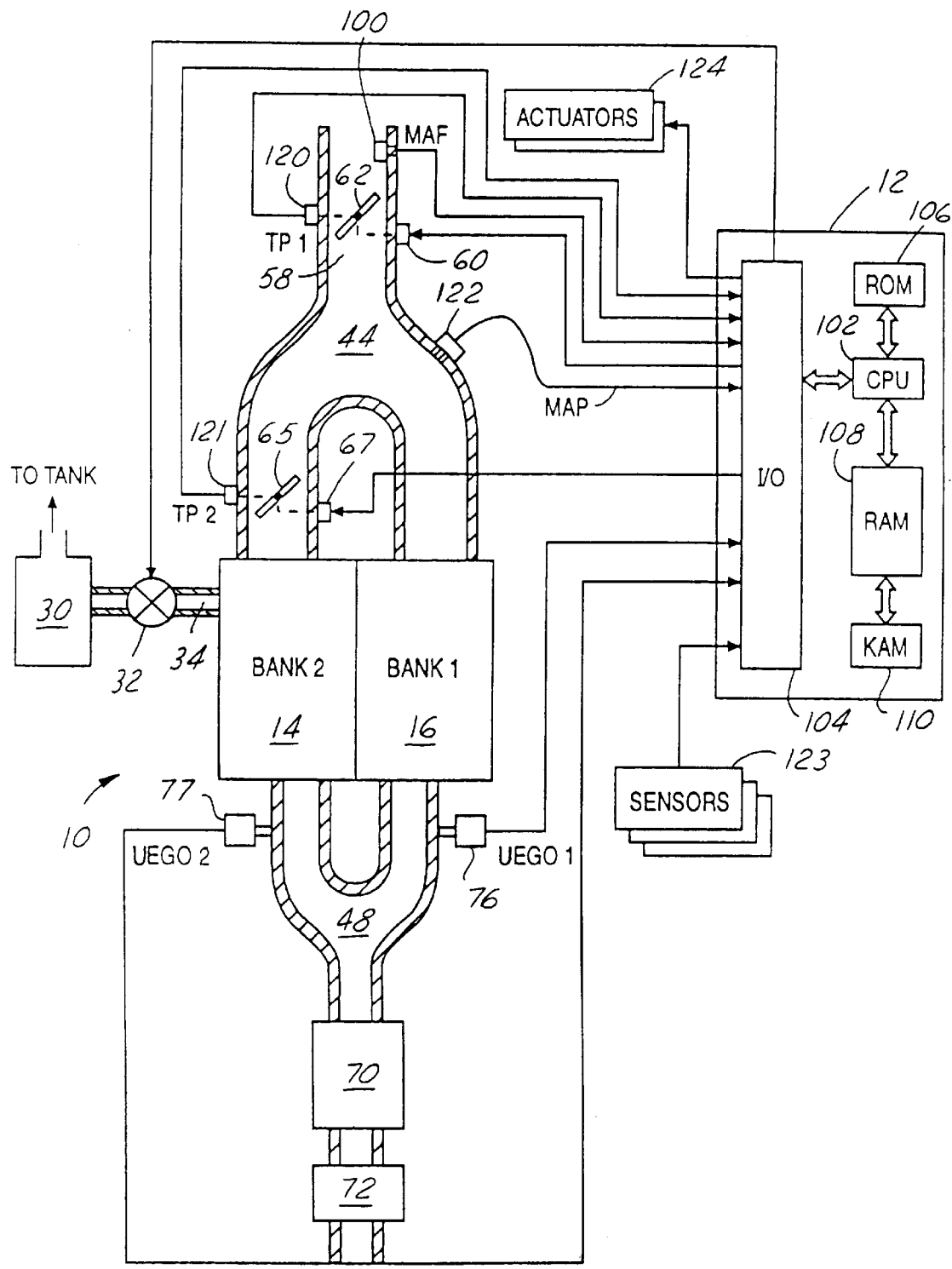
FIGS. 1–3 are block diagrams of an embodiment in which the invention is used to advantage.

Direct injection spark ignited internal combustion engine 10, comprising a plurality of combustion chambers, is controlled by electronic engine controller 12. Engine 10 has two banks, 14 and 16 respectively, each having a set of cylinders therein. In this particular example, banks 14 and 16 have equal numbers of cylinders; however, the number of cylinders may be different and either bank may have only 1 cylinder therein.

Bank 14 of engine 10 is shown coupled to purge system via vapor management valve 32 and vapor passage 34 for receiving air and fuel vapors from canister 30, which is coupled to a fuel tank (not shown) as described later herein with particular reference to FIG. 3. Engine 10 is also shown coupled to intake manifold 44 and exhaust manifold 48. Intake manifold 44 is shown communicating with throttle body 58 via throttle plate 62. In this particular example, throttle plate 62 is coupled to electric motor 60 so that the position of throttle plate 62 is controlled by controller 12 via electric motor 60. This configuration is commonly referred to as electronic throttle control (ETC) which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway. In general terms, throttle plate 62 is used to control engine torque when operating in a homogeneous mode. When operating in a stratified mode, throttle plate 62 is generally placed in a wide open position.

Intake manifold 44 also has secondary throttle plate 65. In this particular example, secondary throttle plate 65 is coupled to electric motor 67 so that the position of secondary throttle plate 65 is controlled by controller 12 via electric motor 67. Secondary throttle plate 65 is used to control inducted airflow into bank 14. In an alternative embodiment (not shown), a pneumatic actuator is coupled to secondary throttle plate 62 to control inducted airflow to bank 14.

Exhaust gas oxygen sensors 76 and 77 are shown coupled to exhaust manifold 48 for banks 16 and 14, respectively, upstream of catalytic converter 70. In this particular example, sensor 76 provides signal UEGO1 to controller 12 which correlates in a substantially linear way to the actual air/fuel ratio of the exhaust gases near sensor 76. Sensor 77 provides signal UEGO2 to controller 12 which correlates in a substantially linear way to the actual air/fuel ratio of the exhaust gases near sensor 77. Signals UEGO1 and UEGO2 are used to advantage during feedback air/fuel control in a manner to maintain average air/fuel at a desired air/fuel during either in the homogeneous mode or stratified mode of operation. Alternative locations of sensors 76 and 77 can be used, such as, for example, placing sensor 76 such that exhaust gas from both banks 14 and 16 contact sensor 76.

Nitrogen oxide (NOx) absorbent or trap 72 is shown positioned downstream of catalytic converter 70. NOx trap 72 absorbs NOx when engine 10 is operating lean of stoichiometry. The absorbed NOx is subsequently reacted with HC and catalyzed during a NOx purge cycle when controller 12 causes engine 10 to operate in either a rich homogeneous mode or a stoichiometric homogeneous mode.

Controller 12 is shown in FIG. 1 as a conventional microcomputer including: microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including: measurement of inducted mass air flow (MAF) from mass air flow sensor 100 coupled to throttle body 58; throttle position TP1 from throttle position sensor 120; secondary throttle position TP2 from throttle position sensor 121; absolute manifold pressure signal MAP from sensor 122; and various other signals from other sensors 123 as described later herein. Controller 12 also sends signals to vapor management valve 32 and various other actuators 124 as described later herein. Manifold pressure signal MAP provides an indication of engine load.

Figure 2:
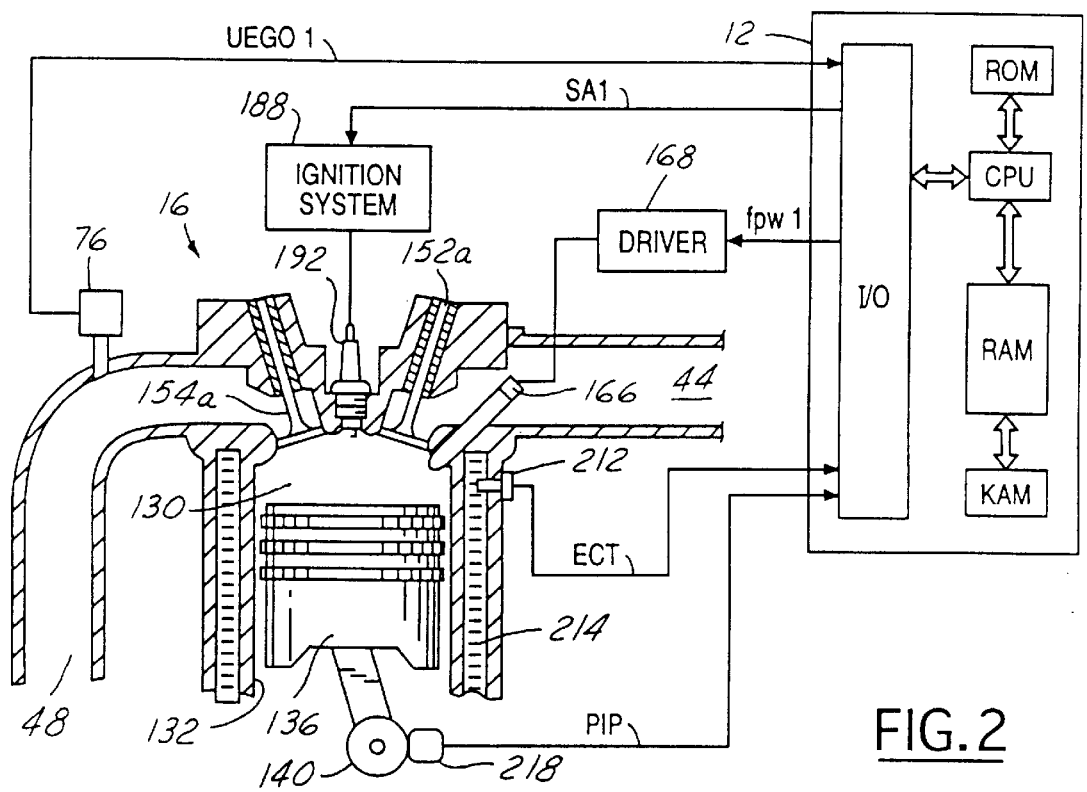

Referring now to FIG. 2, one of the plurality of combustion chambers, combustion chamber 130 of bank 16, is shown including combustion chamber walls 132 with piston 136 positioned therein and connected to crankshaft 140. In this particular example piston 130 includes a recess or bowl (not shown) to help in forming stratified charges of air and fuel. Combustion chamber 130 is shown communicating with intake manifold 44 and exhaust manifold 48 via respective intake valves 152a and 152b (not shown), and exhaust valves 154a and 154b (not shown). Fuel injector 166 is shown directly coupled to combustion chamber 130 for delivering liquid fuel directly therein in proportion to the pulse width of signal fpw1 received from controller 12 via conventional electronic driver 168. Fuel is delivered to fuel injector 166 by a conventional high pressure fuel system (not shown) including a fuel tank, fuel pumps, and a fuel rail.

Conventional distributorless ignition system 188 provides ignition spark to combustion chamber 130 via spark plug 192 in response to spark advance signal SA1 from controller 12. Controller 12 also receives the following signals; engine coolant temperature (ECT) from a temperature sensor 212 coupled to a cooling sleeve 214 and a profile ignition pickup signal (PIP) from hall effect sensor 218 coupled to crankshaft 140. Engine speed signal RPM is generated by controller 12 from signal PIP in a conventional manner.

Controller 12 causes combustion chamber 130 to operate in either a homogeneous air/fuel mode or a stratified air/fuel mode by controlling injection timing. In the stratified mode, controller 12 activates fuel injector 166 during the engine compression stroke so that fuel is sprayed directly into the bowl of piston 136. Stratified air/fuel layers are thereby formed. The strata closest to the spark plug contains a stoichiometric mixture or a mixture slightly rich of stoichiometry, and subsequent strata contain progressively leaner mixtures. During the homogeneous mode, controller 12 activates fuel injector 166 during the intake stroke so that a substantially homogeneous air/fuel mixture is formed when ignition power is supplied to spark plug 192 by ignition system 188. Controller 12 controls the amount of fuel delivered by fuel injector 166 so that the homogeneous air/fuel mixture in chamber 130 can be selected to be at stoichiometry, a value rich of stoichiometry, or a value lean of stoichiometry. The stratified air/fuel mixture will always be at a value lean of stoichiometry, the exact air/fuel being a function of the amount of fuel delivered to combustion chamber 130.

Figure 3:
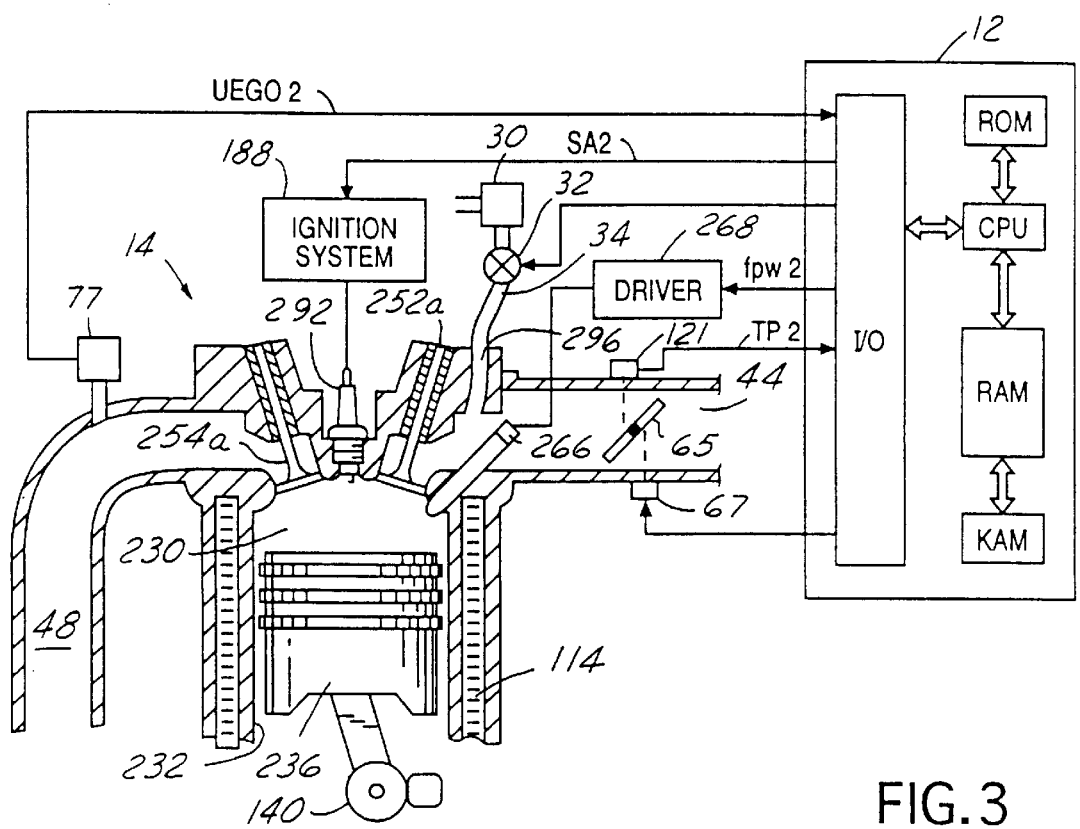

Referring now to FIG. 3, one of the plurality of combustion chambers, purging combustion chamber 230, of bank 14 is shown including combustion chamber walls 232 with piston 236 positioned therein and connected to crankshaft 140. In this particular example piston 230 includes a recess or bowl (not shown) to help in forming stratified charges of air and fuel. Purging combustion chamber 230 is shown communicating with intake manifold 44 and exhaust manifold 48 via respective intake valves 252a and 252b (not shown), and exhaust valves 254a and 254b (not shown). Fuel injector 266 is shown directly coupled to purging combustion chamber 230 for delivering liquid fuel directly therein in proportion to the pulse width of signal fpw2 received from controller 12 via conventional electronic driver 268. Fuel is delivered to fuel injector 266 by a conventional high pressure fuel system (not shown) including a fuel tank, fuel pumps, and a fuel rail.

Conventional distributorless ignition system 188 provides ignition spark to purging combustion chamber 230 via spark plug 292 in response to spark advance signal SA2 from controller 12.

Vapor port 296 is shown communicating with purging combustion chamber 230 via intake valves 252a and 252b (not shown). Vapor port 296 also communicates with a purge system via vapor management valve 32 and vapor passage 34. Thus, according to the present invention, controller 12 is able to control the induction of purge vapors into bank 14 while excluding the induction of vapors into bank 16.

Controller 12 also causes purging combustion chamber 230 to operate in either a homogeneous air/fuel mode or a stratified air/fuel mode by controlling injection timing as in a similar manner to combustion chamber 130 described previously herein with particular reference to FIG. 2.

Figure 4:
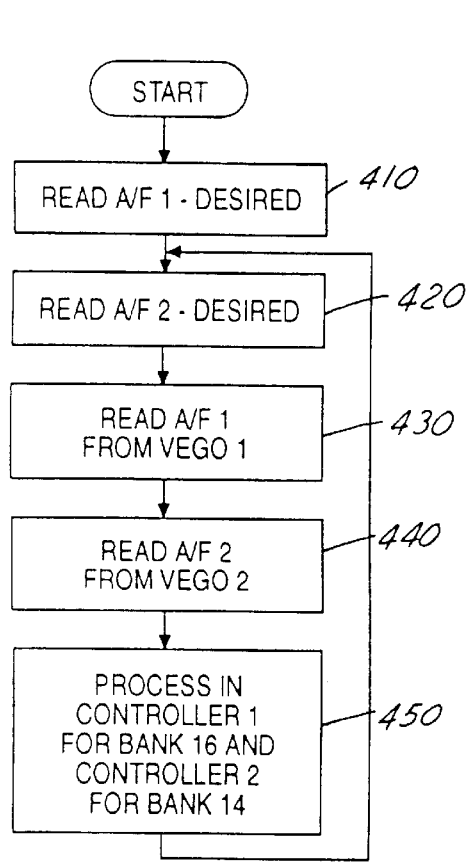
FIG. 4 is a flowchart which describes air/fuel ratio control for the embodiment shown in FIG. 1.

Referring to FIG. 4, the air/fuel ratio control routine is now described. In step 410 the desired air/fuel ratio for bank 16 (A/F1__DESIRED) is read. The desired air/fuel ratio for bank 16 (A/F1__DESIRED) is generated from a high level controller, such as, for example, a torque based engine controller, an emission control system, or any other system known to require a specific air/fuel ratio. In one particular aspect of the present invention, signal A/F1__DESIRED is generated based on a desired engine torque when the bank 16 is operating in a stratified mode. Next, in step 420, the desired air/fuel ratio for bank 14 (A/F2__DESIRED) is read. The desired air/fuel ratio for bank 14 (A/F2__DESIRED) is also generated from a high level controller in a manner similar to AF1__DESIRED. Then, in steps 430 and 440, the actual air/fuel ratios of banks 16 and 14 are measured from signals UEGO1 and UEGO2, respectively. Then, in step 450, signals UEGO1 and A/F1__DESIRED are processed in a controller to create signal fpw1. Similarly, signals UEGO2 and A/F2__DESIRED are processed in a controller to create signal fpw2. In a preferred embodiment, the controllers are both proportional plus integral controllers and an feed-forward estimate is used based on the mass air flow signal (MAF). Alternatively, any controller known to those skilled in the art and suggested by this disclosure could be employed, such as, for example, a proportional plus derivative controller. Similarly, the feed-forward estimate may be based on the manifold pressure signal (MAP).

Figure 5:
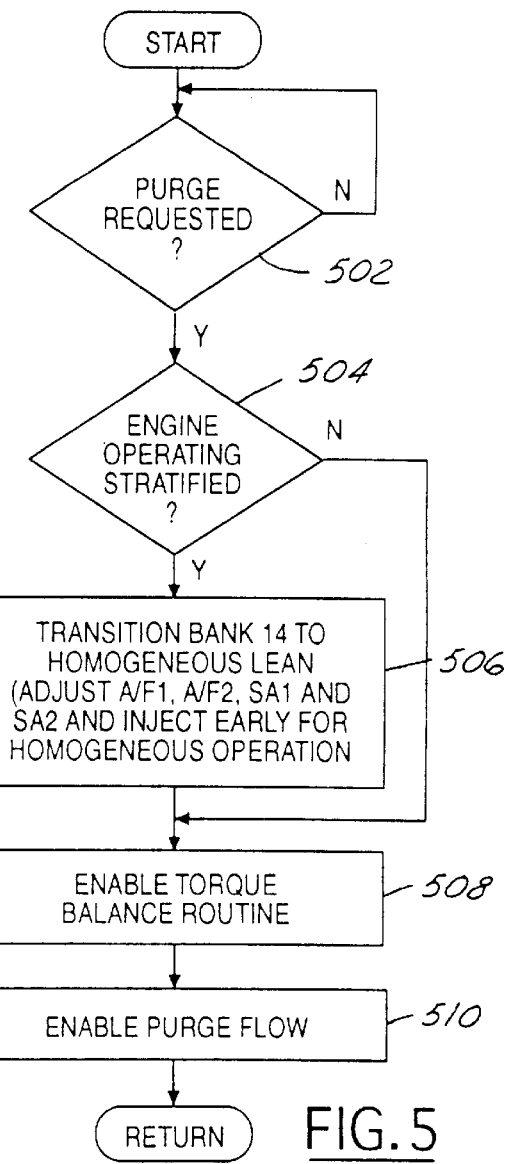
FIGS. 5–6 are flowchart which describe the purging procedure for the embodiment shown in FIG. 1.

Referring now to FIG. 5, a routine for controlling vapor purging is described. In step 502, a determination is made as to whether purging of vapors has been requested by a high level controller, such as, for example, a purge vapor management system. When purging is requested, a determination is made in step 504 as to whether the engine is currently operating in a stratified mode. When the engine is operating in a stratified mode, bank 14 is transitioned to a homogeneous mode in step 506. This is done by adjusting the desired air/fuel ratio of bank 14 (A/F2__DESIRED) to a lean value, adjusting signal SA2, and adjusting secondary throttle plate 65 based on engine mapping data. These parameters are adjusted such that the torque produced by cylinders in bank 14, which is operating in a homogeneous mode is equal to torque produced by cylinders in bank 16, which is still operating in a stratified mode. Then, in step 508, active torque control is enabled as described later herein with particular reference to FIG. 6. Then, in step 510, purge flow is enabled. Air/fuel ratio effects from the purge flow are compensated using the air/fuel ratio control scheme described previously herein.

Figure 6:
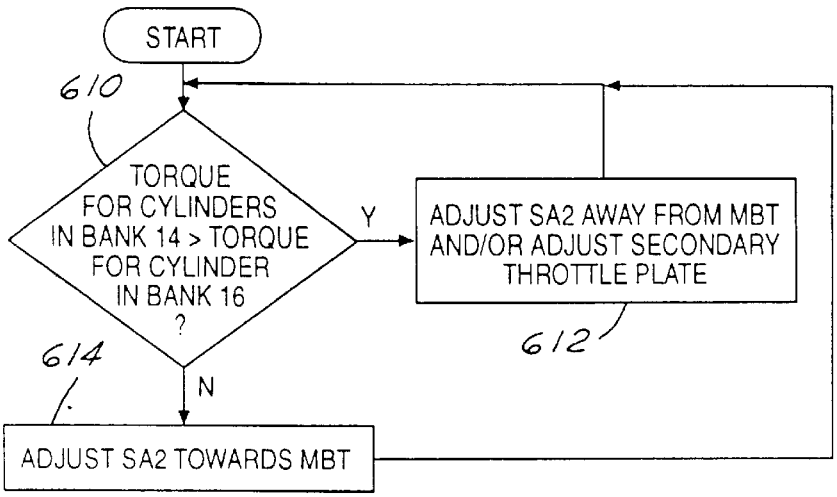

Referring now to FIG. 6, the routine for balancing engine torque from the two banks of cylinders of engine 10 is described. When the torque from the cylinders in bank 14 are greater than the torque from the cylinders in bank 16 (step 610), signal SA2 is adjusted away from MBT, where MBT is the setting for maximum torque based on the current engine operating conditions (step 612). The torque of the banks is determined using a method known to those skilled in the arts where speed fluctuations indicate a torque produced by each cylinder. Alternatively, signal SA2 is adjusted towards MBT in step 614. The adjustments can be accomplished using a proportional controller, or any other controller known to those skilled in the art and suggested by this disclosure, such as, for example, a proportional plus integral controller.

This concludes a description of an example of operation which uses the invention claimed herein to advantage. Many alterations and modifications will come to mind without departing from the scope of the invention. For example, this mode transition method may be used under other operating conditions, such as, for example, during low speed and low load conditions or during highway cruising operation. Accordingly, it is intended that the invention be defined only by the following claims.

We claim:

1. A vapor recovery control system for a spark ignited engine having an air intake with a throttle positioned therein, said engine having a first set of cylinders and a second set of cylinders, said system comprising:

a vapor recovery system coupled to the engine for delivering purge vapor to the first set of cylinders;

a control valve positioned between said vapor recovery system and the first set of cylinders; and a controller for actuating said control valve in response to a purge signal, operating said first set of cylinders in a homogeneous mode of operation with a homogeneous mixture of air and fuel in said first set of cylinders by injecting during an intake stroke, and operating said second set of cylinders in a stratified mode of operation with a stratified mixture of air and fuel in said second set of cylinders by injecting during a compression stroke.

2. The system recited in claim 1 wherein the first and second set of cylinders comprises two banks in a V-type engine.

3. The system recited in claim 1 wherein said controller further adjusts engine operating conditions to maintain a homogeneous torque generated by the first set of cylinders substantially equal to a stratified torque generated by the second set of cylinders.

4. The system recited in claim 3 further comprising a second throttle valve in the air intake between said throttle and the first set of cylinders and said engine operating condition is a position of said second throttle valve.

5. The system recited in claim 3 wherein said engine operating condition is a homogeneous ignition timing.

6. The system recited in claim 1 further comprising a first exhaust gas oxygen sensor coupled to the first set of cylinders and a second exhaust gas oxygen sensor coupled to the second set of cylinders wherein said controller adjusts a first fuel injection quantity of the first set of cylinders based on said first exhaust gas oxygen sensor and adjusts a second fuel injection quantity of the second set of cylinders based on said second exhaust gas oxygen sensor.

7. The system recited in claim 1 wherein said homogeneous mixture of air and fuel is substantially equal to a stoichiometric mixture of air and fuel.

8. The system recited in claim 1 wherein said stratified mixture of air and fuel is substantially lean of a stoichiometric mixture of air and fuel.

9. A vapor recovery control system for a spark ignited engine having an air intake with a throttle positioned therein, said engine having a first set of cylinders and a second set of cylinders, said system comprising:

a vapor recovery system coupled to the engine for delivering purge vapor to the first set of cylinders;

a control valve positioned between said vapor recovery system and the first set of cylinders;

a first exhaust gas oxygen sensor coupled to the first set of cylinders;

a second exhaust gas oxygen sensor coupled to the second set of cylinders; and a controller for actuating said control valve in response to a purge signal, operating said first set of cylinders in a homogeneous mode of operation with a homogeneous mixture of air and fuel in said first set of cylinders by injecting a first fuel injection quantity during an intake stroke, operating said second set of cylinders in a stratified mode of operation with a stratified mixture of air and fuel in said second set of cylinders by injecting a second fuel injection quantity during a compression stroke, controlling said homogeneous mixture of air and fuel to a desired stoichiometric value by adjusting said first fuel injection quantity of the first set of cylinders based on said first exhaust gas oxygen sensor, and controlling said stratified mixture of air and fuel to a desired value lean of stoichiometry by adjusting said second fuel injection quantity of the second set of cylinders based on said second exhaust gas oxygen sensor.

10. The system recited in claim 1 wherein the first and second set of cylinders comprises two banks in a V-type engine.

11. The system recited in claim 9 wherein said controller further adjusts engine operating conditions to maintain a homogeneous torque generated by the first set of cylinders substantially equal to a stratified torque generated by the second set of cylinders.

12. The system recited in claim 11 further comprising a second throttle valve in the air intake between said throttle and the first set of cylinders and said engine operating condition is a position of said second throttle valve.

13. The system recited in claim 11 wherein said engine operating condition is a homogeneous ignition timing.

14. A vapor recovery control method for a vapor recovery system coupled to a spark ignited engine having an air intake with a throttle positioned therein and having a homogeneous mode of operation with a homogeneous mixture of air and fuel within a plurality of combustion chambers and a stratified mode of operation with a stratified mixture of air and fuel within the plurality of combustion chambers, the engine having a first set of cylinders and a second set of cylinders, the method comprising:

directing purge vapors into said first set of cylinders;

operating said first set of cylinders in the homogeneous mode; and operating said second set of cylinders in the stratified mode.

15. The method recited in claim 14 wherein said homogeneous mixture of air and fuel is substantially equal to a stoichiometric mixture of air and fuel.

16. The method recited in claim 14 wherein said stratified mixture of air and fuel is substantially lean of a stoichiometric mixture of air and fuel.

17. The method recited in claim 14 further comprising the step of adjusting engine operating conditions to maintain a homogeneous torque generated by the first set of cylinders substantially equal to a stratified torque generated by the second set of cylinders.

18. The method recited in claim 17 wherein said engine operating conditions include a homogeneous ignition timing.

19. The method recited in claim 17 wherein said engine operating conditions include a homogeneous fresh air quantity.

* * * * *